Figure 1:
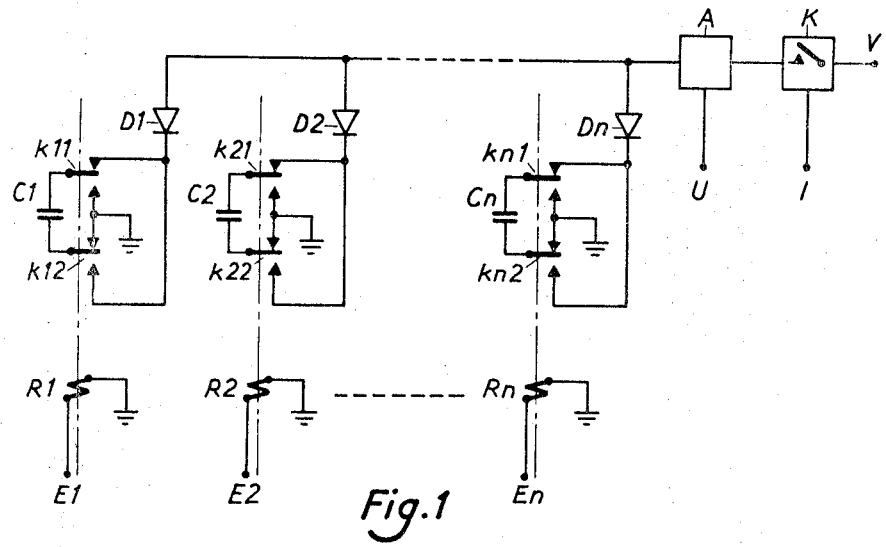

United States Patent

[11] 3,575,607

| [72] | Inventors | Nils Herbert Edstrom<br>Vallingby;<br>Goran Anders Henrik Hemdal, Tyreso,<br>Sweden |
|---|---|---|
| [21] | Appl. No. | 818,764 |
| [22] | Filed | Apr. 23, 1969 |
| [45] | Patented | Apr. 20, 1971 |
| [73] | Assignee | Telefonaktiebolaget L M Ericsson<br>Stockholm, Sweden |
| [32] | Priority | May 28, 1968 |
| [33] | | Sweden |
| [31] | | 7091/68 |

[54] ARRANGEMENT FOR INDICATING CHANGE OF STATE IN ONE OR SEVERAL BISTABLE ELEMENTS
3 Claims, 2 Drawing Figs.

[52] U.S. Cl.................................................... 307/125,
324/28, 340/253, 340/248
[51] Int. Cl........................................................ H01h 47/00
[50] Field of Search........................................... 307/116,
125, 126, 127, 138; 340/253 (B), 248, 253;
324/28; 317/(Inquired)

[56] References Cited
UNITED STATES PATENTS

| 2,800,645 | 7/1957 | Koch, Jr. .................. | 340/253B |
| 3,452,271 | 6/1969 | Ketter ....................... | 324/28 |

Primary Examiner—Robert K. Schaefer
Assistant Examiner—H. J. Hohauser
Attorney—Hane and Baxley ABSTRACT: A circuit arrangement for indicating changes of state in one or several bistable elements, e.g. relays in the interval between two successive scannings of the elements. Each bistable element controls two make-and-break contacts, between which a capacitor is connected, a change of state of the element implying that the polarity of the appertaining capacitor is reversed. This reversing changes the state of an indication arrangement which is subject to the scannings, a change of state of the indication arrangement being recorded upon a scanning indicating that one or several bistable elements have changed their states.

INVENTORS
NILS HERBERT EDSTRÖM
GÖRAN ANDERS HENRIK HEMBAL

BY Hane and Bayley

ATTORNEYS

ARRANGEMENT FOR INDICATING CHANGE OF STATE IN ONE OR SEVERAL BISTABLE ELEMENTS

The present invention relates to an arrangement for indicating a change of state in one or several bistable elements between two successive scannings of the elements.

In a computer used for process control a cyclic scanning of so-called test points takes place, the states of the test points determining the measures to be taken by the computer. The test points may for example be contacts, the states of which are controlled by the process via relays, and the control is carried out when a change of state of a test point causes certain functions determined by the programs of the computer to be performed. In order to record these changes quickly and to insure that no changes escape recording, the scanning of these test points take place sufficiently often. This implies that a large portion of the capacity of the computer is used for scannings even though these scannings mostly indicate that no change has occurred. In order to reduce the time required for scannings it is possible to bring the test points together into groups and to provide each group with a so-called secondary test point. An indication is obtained at a secondary test point as soon as as a change of state has taken place in one or several of the primary test points associated with the secondary test point. The scanning can then be restricted to the secondary test points. Only when an indication at such a test point is obtained will there be a search as to which primary test point changed state. Thereafter necessary measures can be taken in an ordinary manner. This process requires a circuit, by means of which it is possible to obtain a reliable indication whether one or several of a number of relays have changed states between two scannings of the circuit. One way for carrying out this process is to use a so-called flicker-circuit consisting of series connected make-and-break contacts, each one appertaining to one of the relays. The series connection is connected to a bistable circuit via a differentiating network. Thus, at a change of state in a relay, the signal fed to the differentiating network ceases during the actual make-and-break of the contact and the pulse obtained from the differentiating network triggers the bistable stage. Such a circuit is however extremely sensitive to noise since the time constants required in the circuits must be small. An object of the present invention is therefore to provide a circuit which is insensitive to noise and in which upon a scanning a reliable indication is obtained if a change of state in one or several of the relays has taken place. The characteristics of the invention will appear from the claims following after the description.

Figure 2:
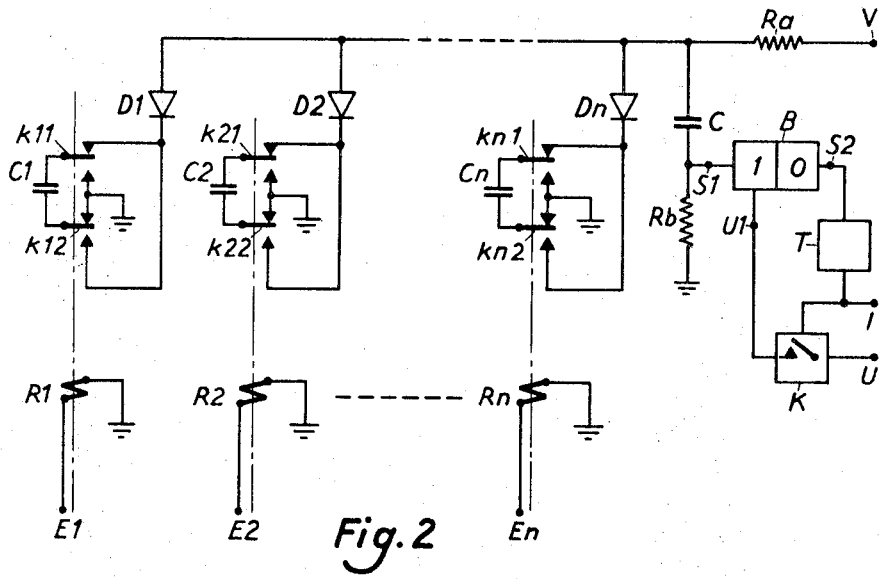

The invention will be described more in detail with reference to the accompanying drawing, in which FIGS. 1 and 2 show different embodiments of the arrangement according to the invention.

In FIG. 1 references R1, R2......Rn denote a number of relays, to which signals are sent via signal sources E1, E2......En. The signals at these sources may, for example, be derived from a computer controlled process. Each relay is provided with two make-and-break contacts $k11$, $k12$, $k21$, $k22$ and $kn1$, $kn2$ respectively. Between the make-and-break contacts appertaining to each relay there is connected a capacitor C1, C2 and Cn, respectively. The contacts are connectable to ground as well as to the cathode of a diode D1, D2 and Dn, respectively, appertaining to each relay. The anodes of the diodes are connected to a positive voltage source V via a current sensing device A and an electronic contact K. The current sensing device is provided with an indication output U at which a signal is obtained when a current flows through the device. The electronic contact is provided with a control input I for closing the contact.

If, in the above-described arrangement, the contact K is closed when the input I is activated, a signal will be obtained at the output U when at least one of the relays R1, R2......Rn has changed its state after the previous closing of the contact K. When the contact is closed the terminal of each capacitor connected to the respective diode obtains the potential $V$ from the voltage source. If, then, after the contact K has reopened, one of the relays changes its state, the polarity of the corresponding capacitor will be reversed, i.e. the terminal having the potential $V$ will be grounded and the other terminal will obtain the potential $-V$. The diode thus prevents the capacitor from being discharged. If one or several capacitors have had their polarity reversed in this way, a current will flow from the voltage source $V$ to the capacitor terminal which has obtained the potential $-V$ upon the next closing of the contact K, a signal being obtained at the output U, while, on the other hand, if no capacitor has had its polarity reversed, no signal will appear. The output may thus be used as a secondary test point for indicating changes of state in the relays R1, R2.....Rn.

In FIG. 2, where components in common with FIG. 1 have the same references as this last-mentioned FIG., the anodes of the diodes D1.....Dn are connected to the voltage source via a resistance Ra. Between ground and the terminal of the resistance, remote from the voltage source, a capacitor C is connected in series with a resistance Rb. The junction point of the capacitor C and the resistance Rb is connected junction to a first trigger input S1 of a bistable flip-flop circuit B having its other trigger input S2 connected to the input I of the arrangement, via a delay circuit T, and its output U1 connected to the output U, via a contact K, which closes upon activation of the input I. The flip-flop circuit being arranged so that a signal at the first trigger input S1 initiates a signal on output U1 and a signal at the other trigger input S2 terminates the signal at the output U1.

When the state of a relay is changed a negative potential is obtained at the cathode of the diode appertaining to the relay, in the same way as in FIG. 1. Hereby a negative potential drop is obtained at the first trigger input S1 of the flip-flop circuit B via the capacitor C, the duration of the drop being determined by the dimensioning of the circuit comprising elements Ra, C, Rb, and implying an activation of the output U1. Further changes of the states of the relays will then not influence the state of the flip-flop circuit B. Upon scanning of the arrangement the input I is activated, a signal being obtained at the output U if a relay has not changed its state since the previous scanning, whereafter the bistable stage is triggered via the delay circuit T. In this embodiment the bistable flip-flop circuit B thus constitutes a storage element by means of which a more reliable function is obtained, particularly when the scannings are made at relatively long intervals.

We claim:

1. Arrangement for indicating a change of state in one or several bistable elements between two successive scannings of an indication arrangement common for all said elements, comprising a plurality of rectifiers, a first and a second make-and-break contact associated with each of said bistable elements, said two contacts being in a first or a second position in dependence on the state of the associated bistable element and of which make-and-break contacts the first one is connected to ground in the first state and the second one in the second state, while the first contact in the second state and the second contact in the first state are connected to one electrode of one of said rectifiers associated with the respective bistable element, a capacitor being connected between each of said make-and-break contacts, the second electrode in all rectifiers being connected to a common connection point, said rectifiers being connected and poled in such a manner that a current cannot flow between said capacitors, the connection point having a reference potential as long as no change of state has taken place after a scanning, the change of state of one of said bistable elements resulting in the polarity of the associated capacitor being reversed and the potential of said connection point being changed, said connection point being connected to said indication arrangement, the state of which is changed upon said change of potential, a changed state of the indication arrangement upon scanning indicating said change of state of said bistable elements, and the state of the indication arrangement being restored after the scanning.

2. Arrangement according to claim 1, wherein said indication arrangement is a current sensing device connected to a direct current voltage source of said reference potential via a contact which closes for each scanning, a current flowing through said current sensing device when said contact is closed if the potential at said connection point has been changed, and said connection point being given the same reference potential at the same time as an indication is obtained at an output of said current sensing device constituting the output of the arrangement.

3. Arrangement according to claim 1, wherein said connection point is on the one hand connected to a direct current voltage source of said reference potential via a resistor and on the other hand connected to ground via a series connection of a capacitor and a resistor, a bistable flip-flop circuit, the connection point of said resistor and said capacitor being connected to one trigger input of said bistable flip-flop circuit, so that a pulse, derived from the potential change at said point sets the flip-flop circuit in a first stable state, in which an output of said flip-flop circuit is activated, said output being connected to the output of the arrangement via a contact which closes upon each scanning of a scanning signal, and that upon scanning the scanning signal is also supplied to a second trigger input of said bistable flip-flop circuit via a delay circuit implying that said flip-flop circuit is restored to the second stable state.